(12) United States Patent
Lin

(10) Patent No.: US 10,783,039 B2
(45) Date of Patent: Sep. 22, 2020

(54) INTELLIGENT BACKUP AND RESTORE SYSTEM

(71) Applicant: Yeejang James Lin, San Jose, CA (US)

(72) Inventor: Yeejang James Lin, San Jose, CA (US)

( * ) Notice: Subject to any disclaimer, the term of this patent is extended or adjusted under 35 U.S.C. 154(b) by 242 days.

(21) Appl. No.: 15/723,938

(22) Filed: Oct. 3, 2017

(65) Prior Publication Data

US 2018/0024888 A1 Jan. 25, 2018

Related U.S. Application Data

(60) Division of application No. 14/333,201, filed on Jul. 16, 2014, now Pat. No. 9,792,180, which is a continuation-in-part of application No. 14/267,665, filed on May 1, 2014, now abandoned.

(51) Int. Cl.
| | | |
|---|---|---|
| *G06F 16/00* | (2019.01) | |
| *G06F 11/14* | (2006.01) | |
| *G06F 16/21* | (2019.01) | |
| *G06F 11/34* | (2006.01) | |

(52) U.S. Cl.
CPC ......... *G06F 11/14* (2013.01); *G06F 11/1469* (2013.01); *G06F 16/00* (2019.01); *G06F 16/219* (2019.01); *G06F 11/1451* (2013.01); *G06F 11/3476* (2013.01); *G06F 2201/80* (2013.01); *G06F 2201/84* (2013.01)

(58) Field of Classification Search
CPC ..... Y10S 707/99953; Y10S 707/99954; G06F 11/1469; G06F 11/2094; G06F 16/2358
See application file for complete search history.

(56) References Cited

U.S. PATENT DOCUMENTS

| | | | | |
|---|---|---|---|---|
| 6,651,077 | B1* | 11/2003 | East ................... | G06F 11/1469 |
| 8,151,139 | B1* | 4/2012 | Gordon .............. | G06F 11/1469 714/15 |
| 8,296,271 | B1* | 10/2012 | Richardson ......... | G06F 11/1469 707/674 |
| 8,903,779 | B1* | 12/2014 | Holenstein .......... | G06F 11/1469 707/685 |
| 2002/0169824 | A1* | 11/2002 | Dettinger ............ | G06F 16/9574 709/203 |
| 2004/0260726 | A1* | 12/2004 | Hrle .................... | G06F 11/1466 |
| 2006/0155743 | A1* | 7/2006 | Bohannon ........... | G06F 16/2365 |
| 2008/0148260 | A1* | 6/2008 | Morita ................ | G06F 9/545 718/101 |
| 2012/0089576 | A1* | 4/2012 | Singla ................. | G06F 11/1448 707/674 |
| 2014/0195492 | A1* | 7/2014 | Wilding .............. | G06F 11/1471 707/684 |
| 2014/0258241 | A1* | 9/2014 | Chen ................... | G06F 16/2365 707/683 |

\* cited by examiner

*Primary Examiner* — Cheyne D Ly
(74) *Attorney, Agent, or Firm* — Wang Law Firm, Inc.

(57) ABSTRACT

A system allows smart backup and restore of databases. The system identifies a database affected by a database operation recorded by a database event record, identifies a database operation time recorded by the database event record, and requests to restore the database to a version backed up prior to the database operation time.

8 Claims, 7 Drawing Sheets

INTELLIGENT BACKUP AND RESTORE SYSTEM

RELATED APPLICATION

This application is a divisional and claims the benefit of the U.S. patent application Ser. No. 14/333,201, filed on Jul. 16, 2014, which will be issued as U.S. Pat. No. 9,792,180, on Oct. 17, 2017, which is a continuation-in-part of U.S. patent application Ser. No. 14/267,665, filed on May 1, 2014, for Business Change Management System, now abandoned.

FIELD OF THE INVENTION

The present invention generally relates to database management, and more specifically to a method for database backup and restore.

BACKGROUND OF THE INVENTION

FIG. 1 illustrates a process 100 that allows the manager 102 to enter a change request on his computer 104, which will be carried out by his computer 104 directly and resulting in changes in one or more databases stored on different servers 108, 110. If there is any problem during the operations carried out by the computer 104 and servers 108 and 110, the manager 102 has to rely on the technical support personnel 106 to audit the system and to verify the change is implemented properly.

If a mistake has been made or a data corruption has happened, the manager 102 generally ask help from the technical support personnel 106 to restore and recover the database to a known state. Usually all the databases in the servers are restored to a known state, since it is difficult to know when the database corruption happened and which database file has been corrupted. As consequence the databases are usually restored to the last known state, which usually is when the last system backup is done.

The method described above is slow and imprecise because it requires a restore of all the databases that may be distributed in different servers and the data created since the last system backup are lost as the result of the restore operation. Hence, it is imperative to devise a system and method that enables easy restore of a database that minimizes the negative impact of a restore and it is to this system the present invention is primarily directed.

SUMMARY OF THE INVENTION

The present invention also provides a business change management system with a smart restore capability. The business change management system comprises a network interface unit, in communication with at least one database server, for receiving a database corruption notification from the at least one database server, a control unit, in communication with the network interface, for determining a first change request to a database associated with the database corruption notification, and a database modification unit, in communication with the control unit, for issuing a database restore command to the at least one database server to restore the database, wherein the database restore command causes the database to be restore to a version prior to the first change request and database access commands prior to the first change request are executed.

The foregoing and other objects, features, aspects and advantages of the present invention will become better understood from a careful reading of a detailed description provided herein below with appropriate reference to the accompanying drawings. It is noted that the technology is not limited to the specific embodiments described herein. Such embodiments are presented herein for illustrative purposes only. Additional embodiments will be apparent to people skilled in the relevant art(s) based on the teachings contained herein.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

In the following description, events refer to data transaction activities, including queries and responses, and instances refer to human activities, which trigger data transaction activities. One instance of user activity may trigger one or more events. Identification number and identifier are used interchangeably in the following description.

The business change management system of the present invention links "what happened" to a business system with "what was intended" for the business system, thus allowing easy verification of changes made to the business system. The changes include network changes, database changes, system configuration changes, data changes, etc. The business change management system is integrated with a smart backup system and enables users to selectively roll back the changes made to the business system while preserving unrelated data changes made to the business system.

When a change or a modification is desired in a business system, usually a change request is entered. The change request may be entered through a web page or using a proprietary software and the change request is sent to a support staff, usually an information technology (IT) personnel. The change request is then executed by issuing one or more database command, usually a plurality of structure query language (SQL) commands. One change request may result in modification to one or more databases. For example, hiring a new employee to a corporation involves adding a new entry in a payroll database, adding a new entry in a benefit database, adding a new entry in an organizational database, etc. Each modification to a database is recorded as an event and the events are resulted from instances of the user's command. All the events are recorded by the business change management system and can be retrieved by an auditing process.

When a data corruption occurs, data in one or more databases are affected. Using information generated through auditing changes to the business system, the database impacted by the data corruption can be identified and the database can be restored with minimum impact to other databases not affected by the data corruption.

Figure 1:
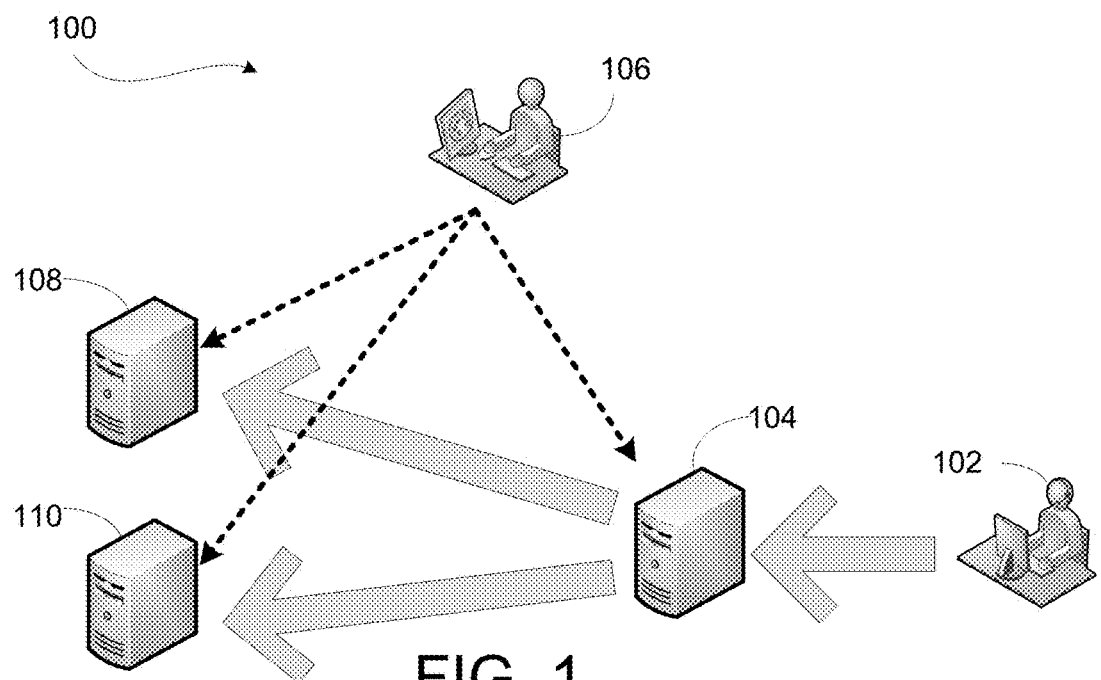
FIG. 1 shows a prior method 100 for a business change process.
Figure 2:
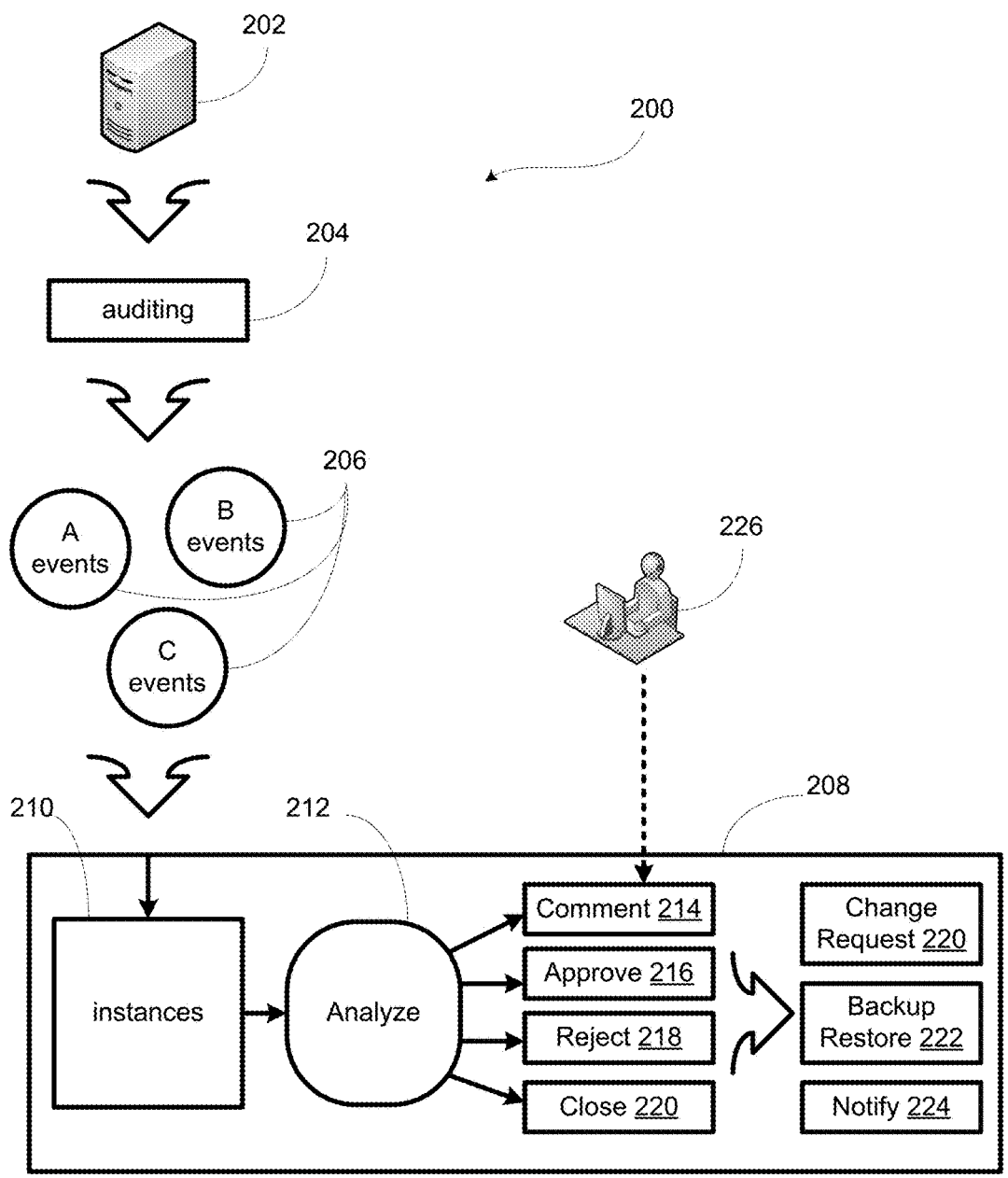
FIG. 2 illustrates a process 200 for checking database integrity performed in a business change management system.

FIG. 2 illustrates a process 200 for auditing changes requests performed by the business change management system of the present invention. Generally, the change requests are implemented and recorded on one or more business databases stored on a server 202. Through an auditing process 204, events 206 that happened during implementation of the change requests are retrieved, filtered and grouped as instances 210. These instances are analyzed 212 and the results are presented to a user 106. The user 106 can then decide what to do next. For example, several employees may have been hired recently and their information entered into the business system and in the server 202. A manager may want to verify that data for these new employees are entered properly and the manager may start an auditing process 204 using the business change management system. The events 206 related to creation of a record for each employee are retrieved and grouped as the instances 210. These instances 210 are analyzed 212. The analysis result is presented to the manager and the manager can approve the changes 216 or reject the changes 218 if the manager notices some problem. The manager can also write a comment 214 or just close the auditing process 204. If the manager decides to approve or reject, which means further modification of the database, a new change request 220 will be generated. The database may be restored 222 if the changes are rejected or data inconsistencies are detected. The database may be backed up 222 if the changes are approved and made permanent. The business system may provide a notification 324 about the result of the auditing process.

Because of all data changes are recorded, even the changes to approve or reject change requests 220, the events associated with these changes can be used to implement intelligent backup and restore of the business change management system.

Figure 3:
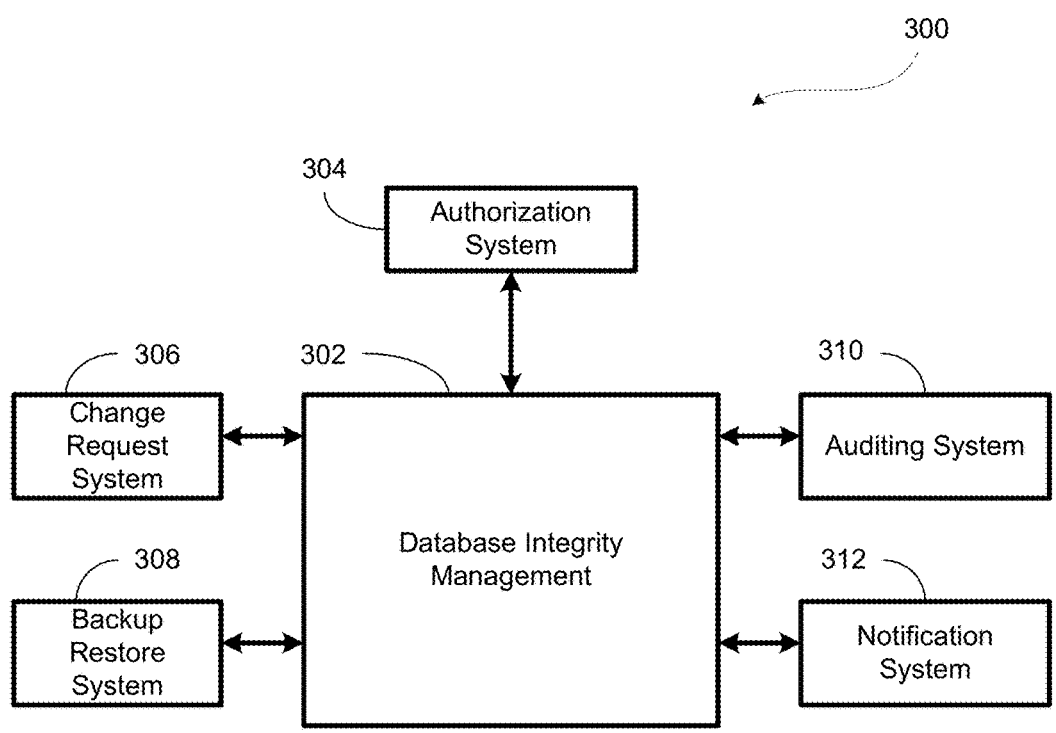
FIG. 3 is architecture 300 of a business change management system according to one embodiment of the present invention.

FIG. 3 is architecture 300 of the business change management system according to one embodiment of the present invention. The business change management system comprises a database integrity management module 302, a user authorization/authentication module 304, a change request module 306, a backup restore module 308, an auditing module 310, and a notification module 312. The user authorization/authentication module 304 is responsible for user identity verification by checking user's login ID and user's password or other means of verification. The change request module 306 interfaces with the user by receiving change request commands and interpreting the change request commands. The change request commands area also recorded by the change request module 306. The backup restore module 308 is responsible for backing up and restoring databases. The auditing module 310 performs database auditing functions by correlating database modification events with instances of change request commands. The notification module 312 interfaces with users and provides notifications to the users. The database management module 302 is responsible for coordinating the actions from different modules and also controlling access to and modification of the databases.

Figure 4:
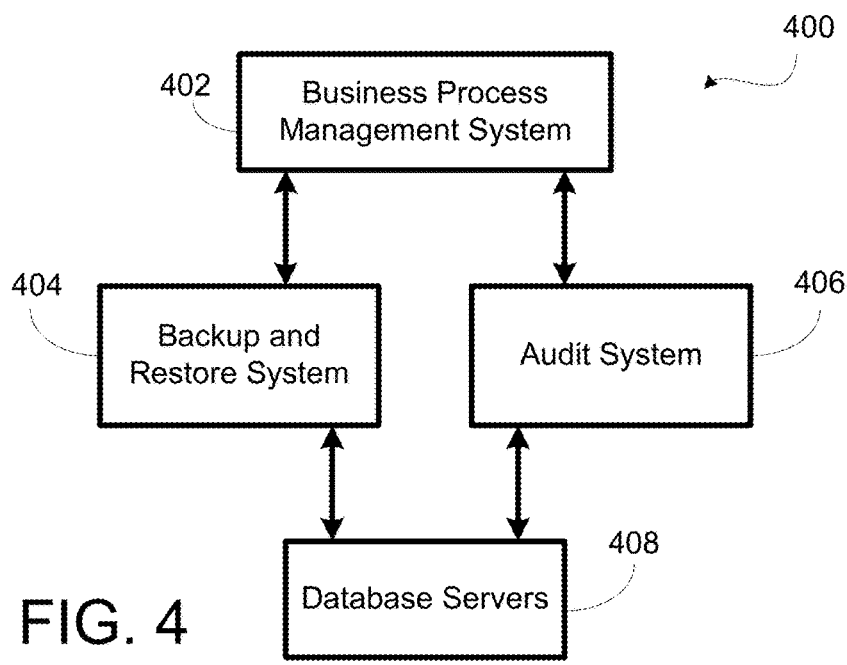
FIG. 4 is a schematic 400 illustrating interactions between a business process, audit process, and backup/restore process.

FIG. 4 is a schematic 400 illustrating interactions between a business process, audit process, and backup/restore process. The business process management system 402 regularly and routinely audits changes made to database servers 408 through interface with an audit system 406. The results generated by the audit system 406 is used by the business process management system 402 in backing up or restoring databases in the database servers 408. The backup and restore of the database is performed by a backup and restore system 404.

Figure 5:
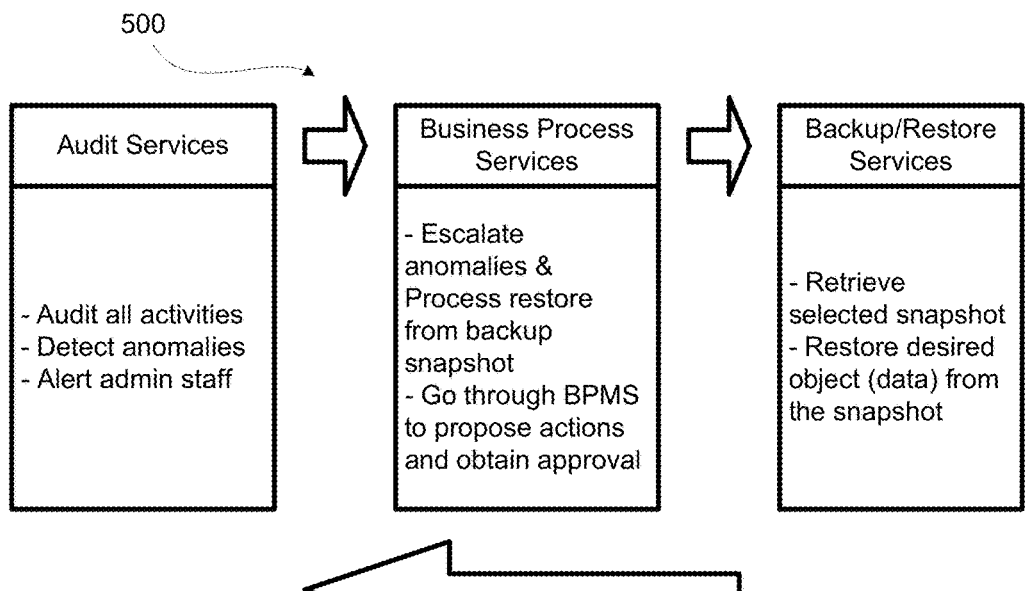
FIG. 5 is a flowchart 500 illustrating interactions of activities between different services.

The interactions between a business process, audit process, and backup/restore process can also be seen through the flowchart 500 in FIG. 5. The audit services performed by the audit system 406 audit all activities to the databases stored in the database servicers 408. The audit system may detect anomalies and alert administrative personnel responsible for running the business process services. The business process services performed by the business process management process handle the anomalies detected from the audit services and this handling may include restore of the database using snapshots collected during the backup procedure. The business process management process provides to a user the options as how to handle the result from the audit services. The backup/restore services performed by the backup and restore system enables the user to determine a specific version of the database to be restored by selecting a particular snapshot of the database. The backup and/or restore operations performed by the backup and restore system modify the databases and therefore, the result of backup and restore operations are subject to audit services.

Figure 6:
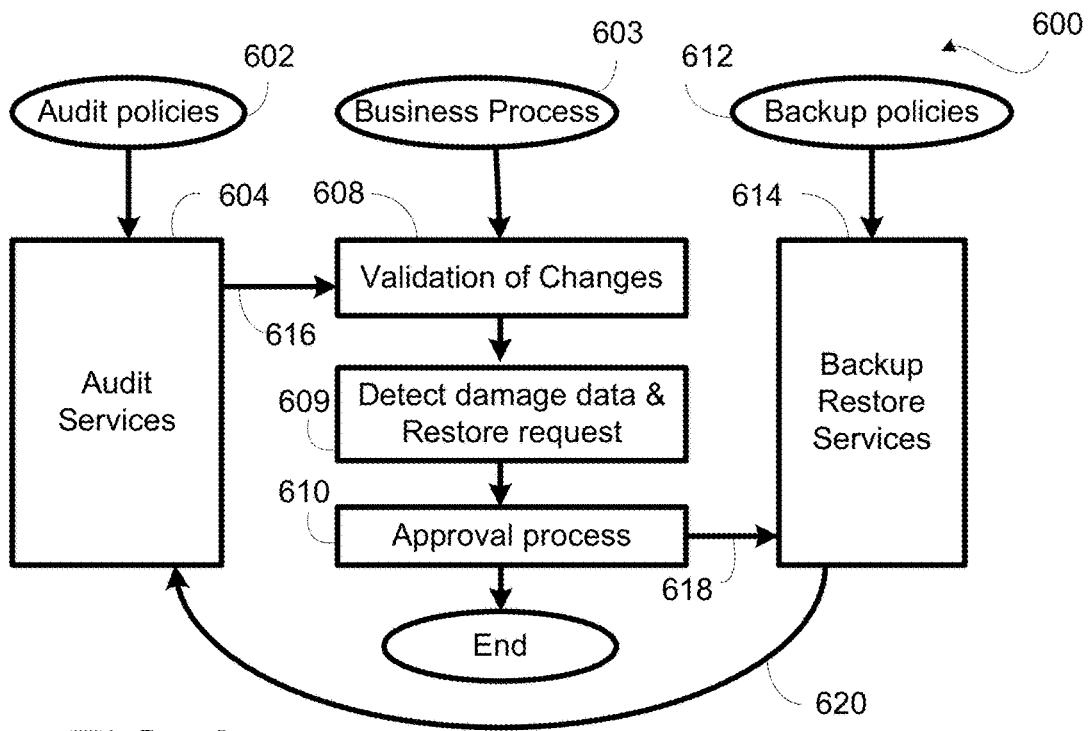
FIG. 6 is an illustration 600 of activities and data exchange between different services.

FIG. 6 is an illustration 600 of activities and data exchange between different services. Audit policies 602 are rules, stored in an audit database and defined by the users (or system administrators), used by the audit services 604. The audit services 604 will retrieve a plurality of events and instances 616 as part of the audit results and these results are submitted to the business management change process 603 for validation of changes 608. The business management change process 603 checks the audit results for indications of damaged data 609 and restores the data if necessary. As part of the approval process 610, if there is no damage data detected, the events and instances will be approved and if there is damage data, the business management process 603 will proceed to restore the data. The data restore request 618 is performed as part of the backup restore services 614. The backup restore services 614 regularly perform backup or restore service according to the backup policies 612.

Backup can be done in different ways. Backup can be a complete backup of a database and can also be done incrementally and differentially, i.e., backup only the data that have been modified. Backup can be done periodically at fixed intervals and a backup snapshot is done at a specific time.

Backup is a database modification operation and is originated by sending one or more SQL commands to a database server. The SQL commands are recorded by the business change management system and the database server usually maintains a log of activities. Because all events (SQL commands) are recorded by the business change management system, when a corruption to a database is detected or an unauthorized database operation is detected, it can be easily identified when the last SQL command was sent to such database and therefore easily identify which copy of the backup database file should be restored. It is also possible to identify all the operations performed to the database since the last database backup, therefore identify the possible cause of the database corruption or the user who performed the unauthorized database operation.

Usually for a typical restore operation, a backup snapshot is chosen after it is determined when a data corruption likely has happened. The restore operation recovers the data that have been corrupted but some good new data may be lost since the typical restore operation restores all data from the chose backup snapshot.

The smart restore operation according to the present invention restores damaged data and also prevents the good new data being overwritten during the restore process. The smart restore operation uses the information from the audit service to track data transactions. By tracking data transactions, a proper backup snapshot can be chosen and the data that have been modified can be restored.

Figure 7:
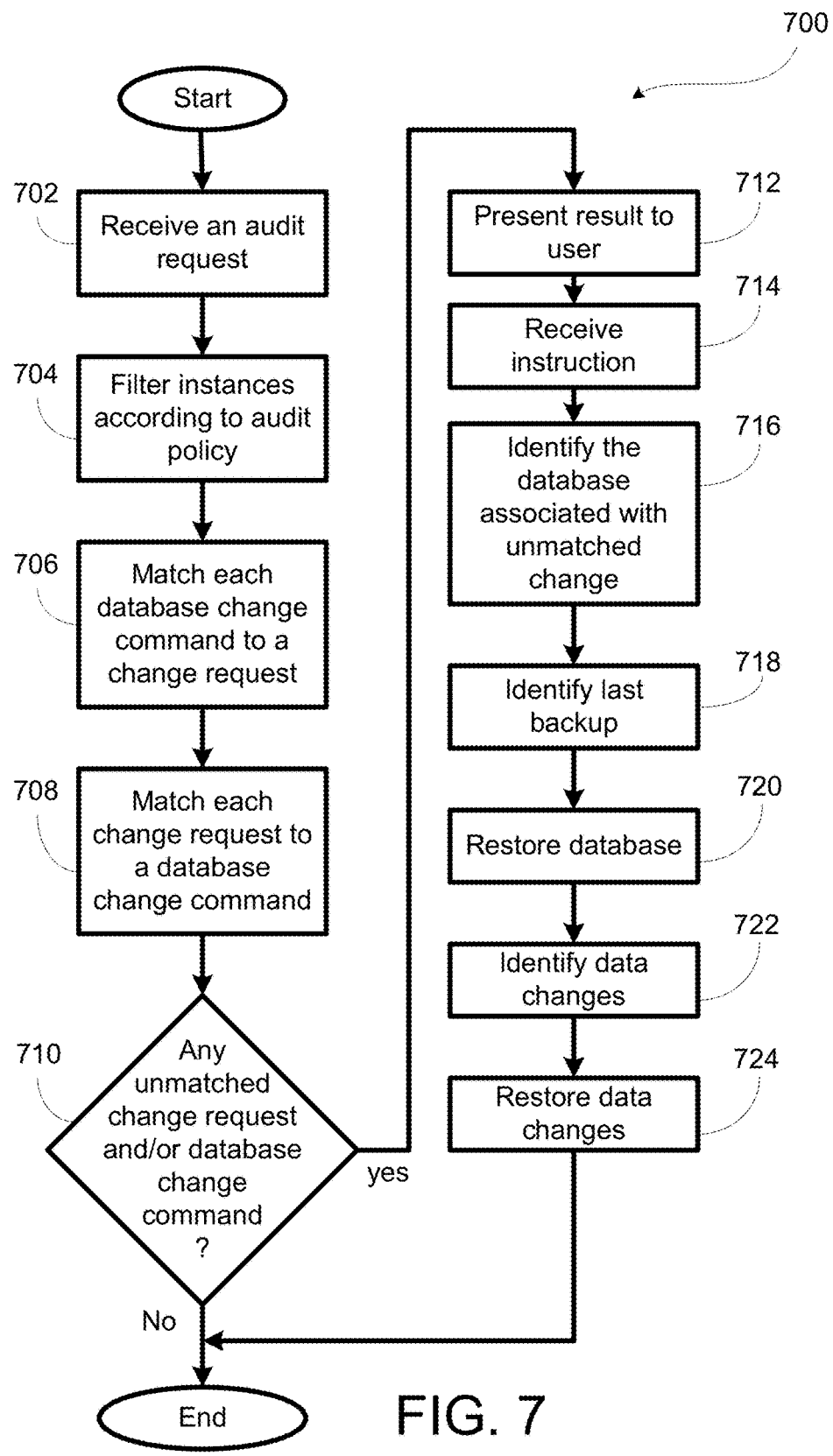
FIG. 7 is a flowchart 700 for auditing database changes and restoring database.

FIG. 7 is a flowchart 700 for an audit and restore process. When the audit process receives an audit request, step 702, a corresponding audit policy is retrieved and the instances and events are retrieved from the database according to the audit policy, step 704. The audit process will match each database change to a change request, step 706, and also match each change request to one or more database commands (SQL commands), step 708. After cross matching the change requests with database change commands, it is checked if there is any unmatched change request or database change command, step 710. If there is no mismatch between the change requests and database change commands, the audit process ends. If there is a mismatch item, the audit result is presented to the user, step 712. If there is an unmatched change request, which means that a change request has not been implemented properly, the user may choose to reissue the change request. If there is an unmatched database change command, which means that there is an unauthorized modification to the database, the user may choose to restore the database. If the user chooses to restore the database, the audit process receives the user command, step 714, and will identify the database associated with this unmatched item, step 716. The unmatched database change command is issued to a database at a specific time, so the audit process can identify the database that was affected and when the database was changed.

After knowing the database and the time when the change occurred, the audit process can identify when the last database backup was done to that database, step 718, and then restore the database, step 720. By knowing the exact version of the database that has been restore, the audit process can also identify all the changes to this database after the database was backed up, step 722, and then restore these changes, step 724. For example, if the copy of the database restored was backed up on Jan. 10, 2014, then the audit process can identify and retrieve all database change commands issued to that database since Jan. 10, 2014, and re-execute these database change commands.

Figure 8:
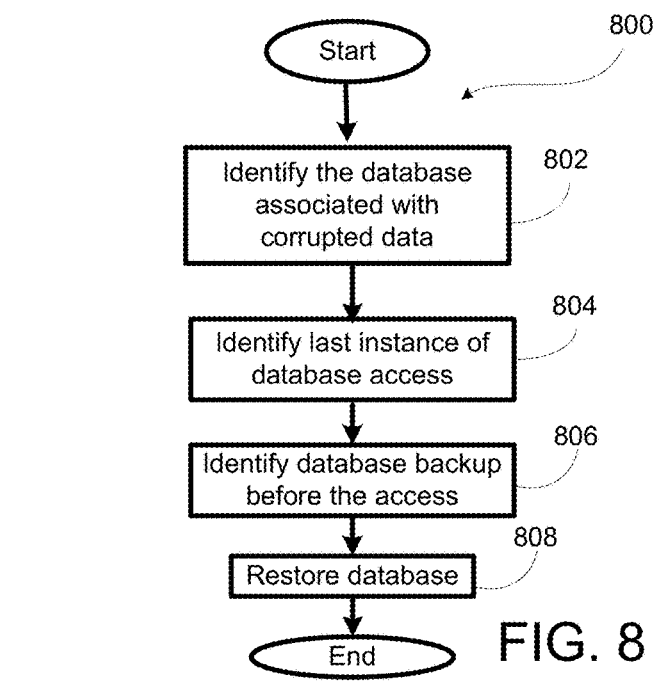
FIG. 8 is a flowchart 800 for restoring database upon data corruption.

FIG. 8 is a flowchart 800 for restoring a corrupted database. When a database corruption is detected, the database change management process identifies the database associated with the corrupted data, step 802, and identify the last database change command issued to that database, step 804. By knowing the last database change command issued to that database, the database change management process can identify the last database backup done before this last database change command is executed, step 806, and restore the database, step 808, and re-execute the last database change command.

Though, upon detecting database corruption, the database is restored to the last modification, the impact of a database corruption may not be limited to this database. It is possible that the effect of the corrupted data has been propagated to other database because the corrupted data may have been read from the database. The business change management system of the present invention can detect the impact of the corrupted data by retrieving events affecting that database since the last modification. By retrieving and identifying all the database change commands affecting to that database, the business change management system is able to provide a list of database that may have used the corrupted data.

Figure 9:
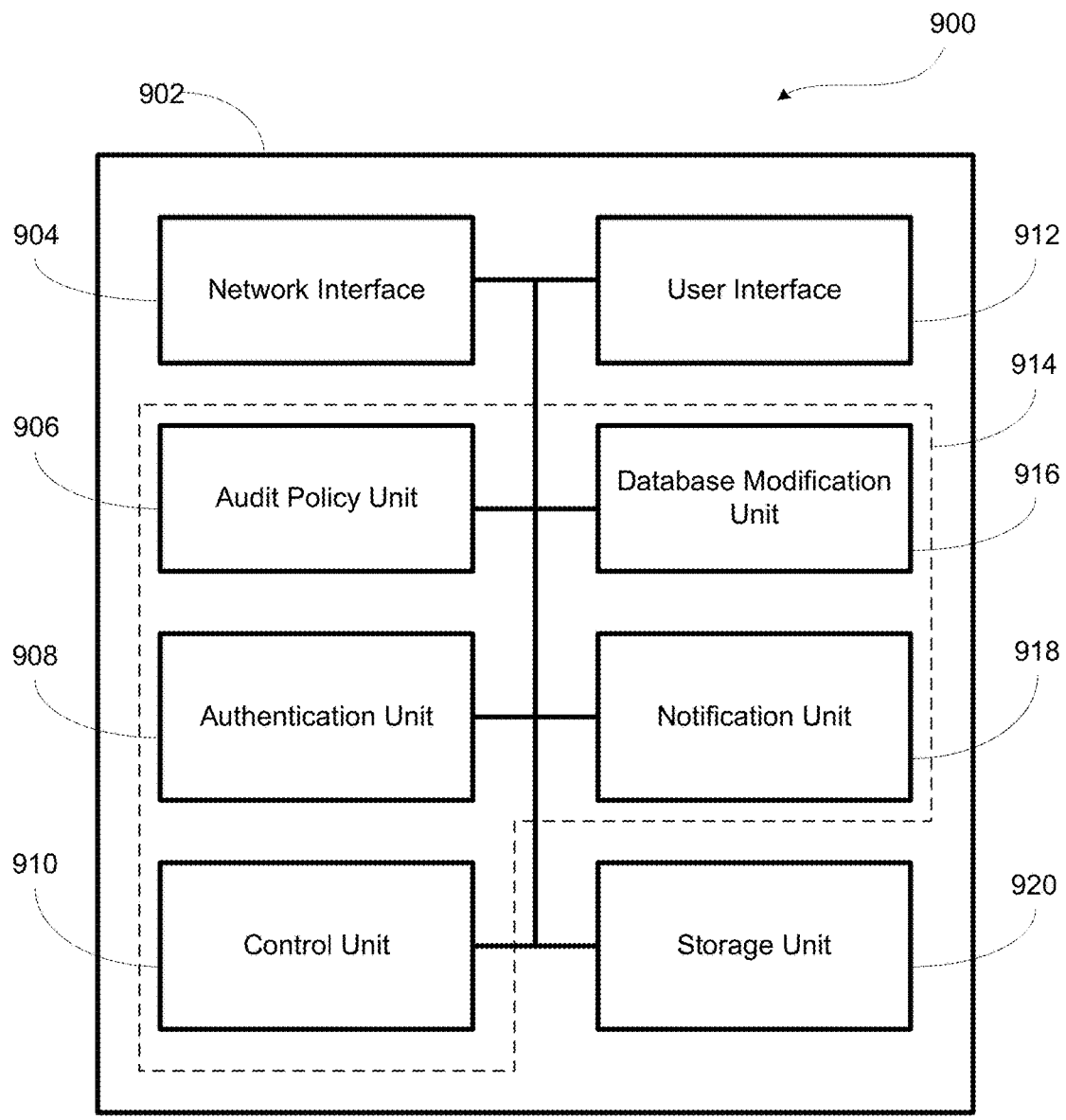
FIG. 9 is architecture 900 of an apparatus of the present invention.

FIG. 9 is an alternative architecture 900 of a business change management system 902 according to the present invention. Instead of being implemented on the server 202 as shown by FIG. 2 and described above, the business change management system may be implemented on a single chip as illustrated on FIG. 9. The business change management system 902 has a network interface unit 904, a user interface unit 912, an audit policy unit 906, a database modification unit 916, an authentication unit 908, a notification unit 918, a control unit 910, and a storage unit 920. The network interface unit 904 communicates with other database servers on the network and also communicates other devices used by remote users. The network interface unit 904 may also receive notification of data corruption from different database servers. The user interface unit 912 controls interface with local users. The audit policy unit 906 is responsible for creating and retrieving audit policies and the control unit 910 receives audit requests from users and then retrieves the audit policy through the audit policy unit 906. The authentication unit 908 controls user access by authenticating users. The database modification unit 916 is responsible for controlling the access and modification to the database that can be located locally in the business change management system 902 or remotely. The database modification unit 916 can generate SQL commands for the business change requests and insert the identifier into these SQL commands. The database modification unit 916 can also executes these SQL commands if the database is local to the business change management system 902. If the database is not local, then the SQL commands are sent to a server in which the database is stored. The notification unit 918 is responsible for sending notices and communications to the users. The storage unit 920 stores databases, including the audit policies.

The control unit 910 also handles backup and restore processes and the control unit 910 may send backup and restore instructions to the database servers. The control unit can identify the database that needs to be restored by retrieving the database information from a database event record saved in the storage unit. From the database event record, the control unit 910 can detect the time when the database was modified or accessed, and a proper copy of the database backed up prior to this time can be retrieved from the backup database and restored. After the database is restored, the control unit 910 may retrieve all the database events that were executed to this database after the time when the database was last modified or accessed and display these database events and/or associated instances of user commands to the user. These database events and/or associated instances of user commands may have to be re-executed. Different units illustrated in FIG. 9 and described above may be combined and functions described above maybe performed by the combined units. The functions described in this specification may be executed by one or more units illustrated in FIG. 9.

The business change system shown in FIG. 9 may also be able to interface with a business user and to receive a business change request through the user interface unit 912 and generate by the control unit 910 an identifier for the business change request.

In operation, the business change management system of the present invention enables a user to easily restore database with minimum impact to the database. When a database restore is needed, the business change management system identifies the database impacted and also which backup copy of the database to be retrieved. The determination of which backup copy is to be retrieved and restored is determined using the instances and events stored by the business change management system.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims. It is understood that features shown in different figures and described in different embodiments can be easily combined within the scope of the invention.

The present technology has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present technology can be implemented by software, firmware, hardware, or a combination thereof. After reading this description, it will become apparent to a person skilled in the relevant art how to implement the technology using other computer systems and/or computer architectures. Features described in different embodiments described in the present specification may be combined.

It is to be appreciated that the Detailed Description section, and not the Summary and Abstract sections, is intended to be used to interpret the claims. The Summary and Abstract sections may set forth one or more but not all exemplary embodiments of the present technology as contemplated by the inventor(s), and thus, are not intended to limit the present technology and the appended claims in any way.

What is claimed is:

1. A business change management system with a smart restore capability, the business change management system comprising:
   a processor;
   an audit unit comparing every database change to a change request, wherein the comparison does not have a matching change request and the comparison results in an unmatched changed request;
   a database modification unit, in communication with the control unit, reissuing the change request; and
   the audit unit comparing every change request with a database change command, wherein the comparison does not have a matching database change command and the comparison results in an unmatched database change command;
   a network interface unit, in communication with at least one database server, receiving a notification of an unmatched database change command from the at least one database server;
   a control unit, in communication with the network interface, determining a database associated with the unmatched database change command and the issue time of the unmatched database change command;
   a database modification unit, in communication with the control unit, issuing a database restore command to the at least one database server to restore the database to a last backup version prior to the time of the unmatched database change command;
   the control unit identifying at least one database change command affecting the restored database since the unmatched database change command;
   the control unit identifying additional databases affected by the unmatched data base change command; and
   the control unit executing the at least one database change command occurred after the last backup and prior to the restoring on the restored database.

2. The business change management system of claim 1 further comprising a storage unit for storing events of the database access commands.

3. The business change management system of claim 2, wherein the control unit further identifying, from the storage unit, a database access command associated with a first change request to the database.

4. The business change management system of claim 1, further comprising an audit policy unit in communication with the control unit, the audit policy unit stores change requests and corresponding database access commands.

5. The business change management system of claim 4, wherein the control unit matches the change requests to the database access commands and the database access commands to the change requests.

6. The business change management system of claim 3, wherein the database access commands prior to the first change request are displayed to a user.

7. The business change management system of claim 1, wherein the control unit identifies the database associated with the unmatched database change command by retrieving a database event record from a storage unit.

8. The business change management system of claim 1, wherein the database event record includes a time when the database was modified.

* * * * *